United States Patent
Yamakawa et al.

(10) Patent No.: US 6,697,039 B1
(45) Date of Patent: Feb. 24, 2004

(54) INFORMATION DISPLAYING APPARATUS

(75) Inventors: Eiji Yamakawa, Sanda (JP); Koichi Kohriyama, Amagasaki (JP); Hideo Hotomi, Nishinomiya (JP); Naoki Masazumi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/510,847

(22) Filed: Feb. 23, 2000

(30) Foreign Application Priority Data

Feb. 24, 1999 (JP) .......................................... 11-046689
Jun. 9, 1999 (JP) .......................................... 11-162536

(51) Int. Cl.[7] ................................................ G09G 5/00
(52) U.S. Cl. ......................... 345/98; 345/87; 345/905; 345/1.1
(58) Field of Search ........................ 345/1.1, 901, 905, 345/87, 173, 88, 98; 349/58, 73

(56) References Cited

U.S. PATENT DOCUMENTS

| | | | | |
|---|---|---|---|---|
| 4,423,929 A | * | 1/1984 | Gomi | 349/83 |
| 4,443,062 A | * | 4/1984 | Togashi et al. | 349/83 |
| 4,597,635 A | * | 7/1986 | Hoshikawa | 349/73 |
| 4,690,510 A | * | 9/1987 | Takamatsu et al. | 349/150 |
| 4,878,741 A | * | 11/1989 | Fergason | 349/79 |
| 5,436,744 A | * | 7/1995 | Arledge et al. | 349/150 |
| 5,457,551 A | * | 10/1995 | Culter et al. | 349/76 |
| 5,625,474 A | * | 4/1997 | Aomori et al. | 349/79 |
| 5,810,604 A | * | 9/1998 | Kopp et al. | 434/317 |
| 5,861,929 A | * | 1/1999 | Spitzer | 349/74 |
| 5,943,033 A | * | 8/1999 | Sugahara et al. | 345/85 |
| 6,067,134 A | * | 5/2000 | Akiyama et al. | 349/74 |
| 6,229,502 B1 | * | 5/2001 | Schwab | 345/1 |
| 6,232,938 B1 | * | 5/2001 | Tsuchida et al. | 345/88 |
| 6,262,785 B1 | * | 7/2001 | Kim | 349/58 |
| 6,377,321 B1 | * | 4/2002 | Khan et al. | 349/35 |
| 6,392,725 B1 | * | 5/2002 | Harada et al. | 349/74 |

FOREIGN PATENT DOCUMENTS

JP  58-005720 A  1/1983
JP  9-329780 A  12/1997

* cited by examiner

*Primary Examiner*—Steven Saras
*Assistant Examiner*—Fritz Alphonse
(74) *Attorney, Agent, or Firm*—Sidley Austin Brown & Wood LLP

(57) ABSTRACT

The disclosed herein is an information display apparatus having first and second liquid crystal displays on a common support plate. Each of the liquid crystal displays includes a plurality of pixels defined by a plurality of scanning electrodes and a plurality of signals electrodes. The scanning electrodes of the first liquid crystal display are respectively connected to the scanning electrodes of the second liquid crystal display so that both of the liquid crystal displays are commonly and simultaneously scanned by a scanning driver commonly provided to the liquid crystal display. The support plate is provided with a folding area between the first and second liquid crystal displays whereby the information display apparatus is capable of carrying with folding and of using with opening just like a conventional book.

12 Claims, 12 Drawing Sheets

INFORMATION DISPLAYING APPARATUS

CROSS REFERENCE TO RELATED APPLICATIONS

This application is based on Japanese Patent Application Nos. 11-046689 and 11-162536 filed on Feb. 24, 1999, respectively, the contents of which are hereby incorporated by reference.

BACKGROUND OF THE INVENTION

1. Field of the Invention

The present invention pertains to an information displaying apparatus, and more particularly to an information displaying apparatus having a display(s) comprising a liquid crystal element or electro-luminescence element.

2. Description of the Related Art

Printed matter using paper as the medium is widely used today in order to provide information over a large geographical area. However, printed matter has the problems that (i) it is discarded as trash after use and (ii) there is concern regarding the depletion of forests that are used as a resource for paper pulp. To eliminate these problems, the inventors of the present invention are developing an electronic book system as a new information providing system. In other words, development is underway to create a system in which information, which has conventionally been printed on paper, may be distributed in the form of a digital information recording medium and the information may be read by the user by means of a displaying apparatus. An example of such a displaying apparatus includes a displaying apparatus comprising liquid crystal elements or electro-luminescence elements. If this electronic book system is established the consumption of paper itself may be reduced, which in turn may alleviate the problems of waste and resource depletion.

Information that may be provided in this form includes all types of printed matter, including books (paperbacks, weekly magazines, monthly magazines, trade journals, etc.), newspapers and advertisements.

Books in the form of digital information will be distributed by the issuer (manufacturer) as information recorded on recording media. A general user who owns (or leases) an electronic book apparatus (information reproduction displaying apparatus) will insert the recording medium into the main unit of the electronic book apparatus and read (reproduce) the information.

In order to make such a system a reality, the electronic book apparatus must be small and thin, like a conventional book, and be able to, display two open pages together and be opened anywhere. The display for such a system must consume a small amount of power to enable the power supply to be compact. In addition, in, order to further reduce the weight and thickness of the electronic book apparatus, reflection type displays that do not require a light source should be used. Preferably, the electronic book apparatus should be mounted with a reflective liquid crystal display that has a memory function and does not require power supply in order to maintain the display of information.

SUMMARY OF THE INVENTION

The object of the present invention is to provide an information displaying apparatus that offers the ease of use of a conventional book.

Another object of the present invention is to provide an information displaying apparatus that is small and thin and can display images on multiple screens.

Yet another object of the present invention is to provide an information displaying apparatus with a display drive unit having a simple construction.

In order to attain these and other objects, the information displaying apparatus pertaining to the present invention has multiple display areas that are separately provided on a single support plate. By having multiple display areas (displays) on a single support plate, the amount of information that may be displayed increases and the right and left pages may be displayed in the style of a conventional book. Further, because multiple displays are electrically connected on a single support plate, the drive means may have a simplified construction. The display areas may be either monochrome or color. In the case of color, multiple units comprising an R layer, G layer and B layer stacked together are mounted on the support plate. In this case, the R, G and B layers of the various units may be electrically connected to each other, or the R, G and B layers of a unit may be electrically connected to each other before the units are electrically connected.

Moreover, in the information displaying apparatus pertaining to the present invention, display substances that display R, G or B, respectively, are sandwiched side by side between a pair of transparent substrates and the pair of transparent substrates is then folded over so that the R, G and B display layers may be stacked on top of one another. In this way, three display layers (for color display) may be manufactured in one process in which the display substances, which each display each of the three primary colors, are placed side by side between a pair of transparent substrates, resulting in reduced variation in performance among the display layers and increased production yield.

In particular, where each display layer is driven by means of scanning electrodes and signal electrodes that are located in the form of a matrix, if the scanning electrodes are electrically connected among the display layers, only one drive means (driver) is required, resulting in compact size and low cost. Further, it is also possible to construct the image forming apparatus by means of multiple color displays, one unit of which comprises three layers. If the scanning electrodes are electrically connected among the units, one drive means (driver) may be shared by all units in this case as well.

It is also preferred that the information displaying apparatus pertaining to the present invention use a reflective liquid crystal display having a memory function. For the liquid crystal, liquid crystal that shows the cholesteric phase at room temperature (such as chiral nematic liquid crystal) is preferably used. Liquid crystal of this type that has a memory function does not require the use of glass for the substrate and therefore does not entail the risk of damage. In addition, it is easy to control the molecular orientation in this type of liquid crystal. It also has a large field of view and is not subject to uneven performance when used in a large screen. Moreover, because it has a memory function, it does not consume power to maintain the display, which is economical, is not adversely affected by noise, and is capable of maintaining the display even if the power supply is shut down.

In particular, if the construction in which a chiral nematic liquid crystal material and resin bodies are sandwiched between transparent plastic film is used, a thin and lightweight information displaying apparatus that is highly resistant to external force (such as bending and impact) may be obtained, which is most appropriate for a portable information apparatus such as the electronic book that the present invention aspires to help realize.

BRIEF DESCRIPTION OF THE DRAWINGS

These and other objects, advantages and features of the invention will become apparent from the following description thereof taken in conjunction with the accompanying drawings in which:

FIGS. 4(A) and 4(B) show a construction of the information displaying apparatus pertaining to the present invention that has two color displays, wherein FIG. 4(A) shows the situation in which the support plate is extended, and FIG. 4(B) shows the situation in which the support plate is folded over;

DETAILED DESCRIPTION OF THE PREFERRED EMBODIMENTS

The embodiments of the information displaying apparatus pertaining to the present invention are explained below with reference to the accompanying drawings. (Example of arrangement of multiple display screens)

Figure 1A:
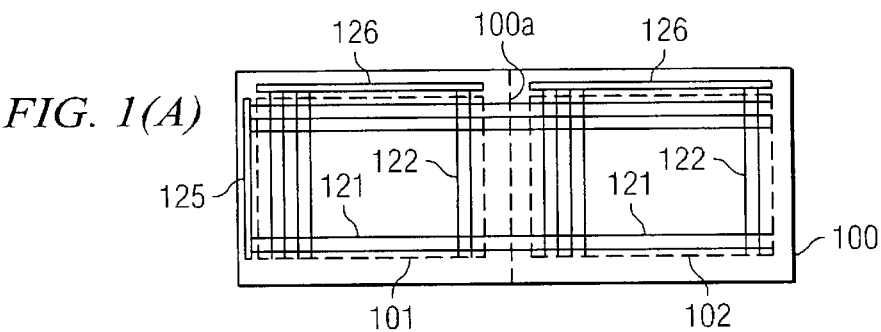
FIGS. 1(A) through 1(D) are drawings to explain various screen arrangements in the information displaying apparatus pertaining to the present invention.
Figure 1B:
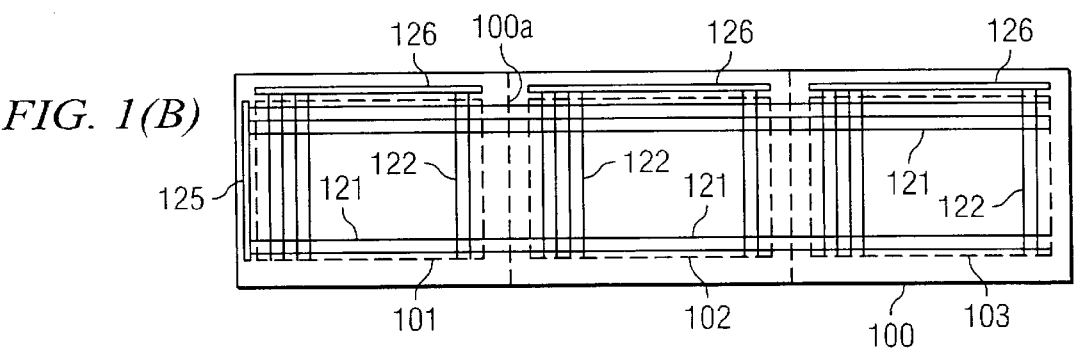
Figure 1C:
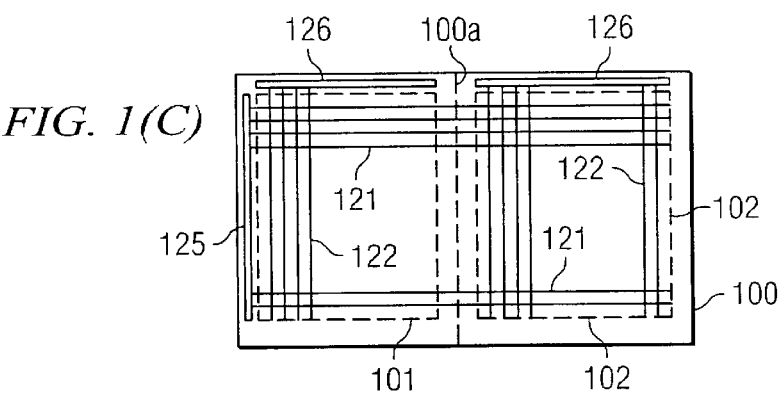
Figure 1D:
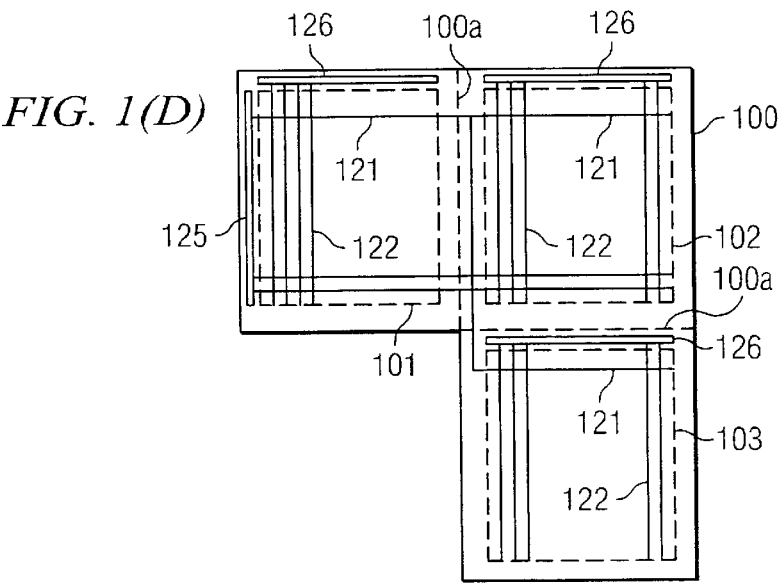

FIGS. 1(A) through 1(D) show various examples of the information displaying apparatus having multiple display areas on a single support plate. FIGS. 1(A) and 1(C) show examples in which two display areas 101 and 102 are arranged on a single support plate 100 (a pliable resin sheet), and FIGS. 1(B) and 1(D) show examples in which three display areas 101, 102 and 103 are arranged on a single support plate 100. In these information displaying apparatuses, the display areas 101, 102 and 103 are independent displays. For the display, a liquid crystal display, electro-luminescence display or plasma display may be used, for example. The display may be a color display or monochrome display using a single color. With reference to FIGS. 1 through 3, an explanation that assumes for the sake of convenience that the display is a monochrome display will be provided.

These displays 101, 102 and 103 are driven by means of scanning electrodes 121 and signal electrodes 122, which are located in a matrix fashion, with each of their crossing points functioning as one pixel. The scanning electrodes 121 are electronically connected among the displays 101, 102 and 103. Therefore, while each display 101, 102 or 103 is equipped with a dedicated drive IC 126 that drives the signal electrodes 122, one drive IC 125 is shared among the displays 101, 102 and 103 for the driving of the scanning electrodes 121.

The support plate 100 may be folded over at mid-sections 100a, which are indicated by boldface dotted lines in FIGS. 1(A) through 1(D), such that the displays 101, 102 and 103 will be face the inside. Therefore, each information displaying apparatus may be folded over while not in use (during storage or while being carried) and opened during use (when viewing the information).

Figure 2A:
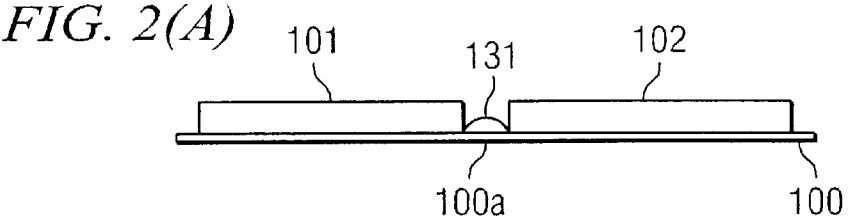
FIGS. 2(A) through 2(C) are drawings to explain various ways of connecting the scanning electrodes in the information displaying apparatus shown in FIG. 1(A)
Figure 2B:
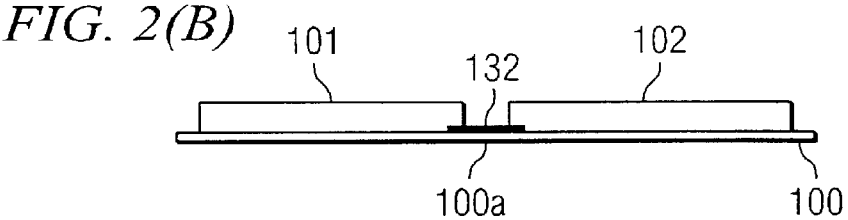
Figure 2C:
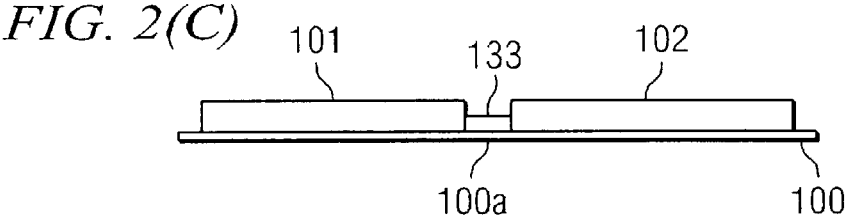
Figure 3:
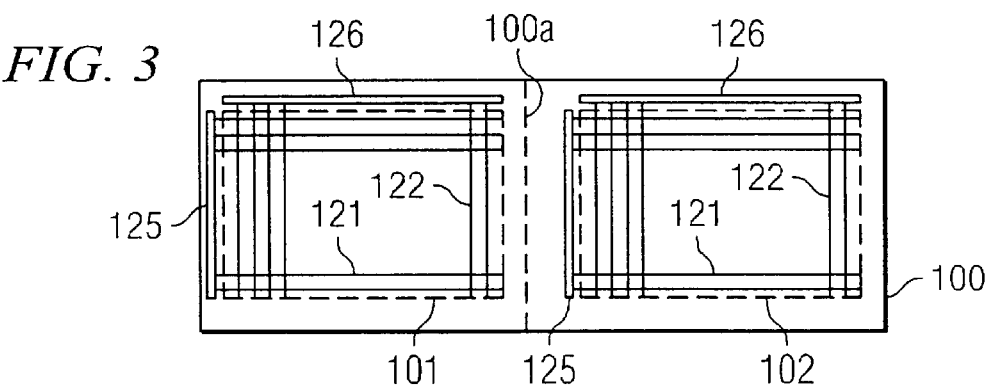
FIG. 3 is a drawing to explain another embodiment of the information displaying apparatus pertaining to the present invention.

FIGS. 2(A) through 2(C) shows the forms of electric connection between the displays 101 and 102. This connection must be made such that the pliability of the mid-section 100a of the support plate 100 is not compromised. FIG. 2(A) shows an example in which the displays are connected via a conductor formed on a flexible sheet 131. FIG. 2(B) shows an example in which they are connected via a conductor 132 formed on the support plate 100. FIG. 2(C) shows an example in which they are connected via a flexible connector 133.

The scanning electrodes 121 of the displays 101, 102 and 103 need not be necessarily connected electrically. If they are not connected, each display 101, 102 or 103 should be equipped with a dedicated scanning drive IC 125, as shown in FIG. 3.

Figure 4A:
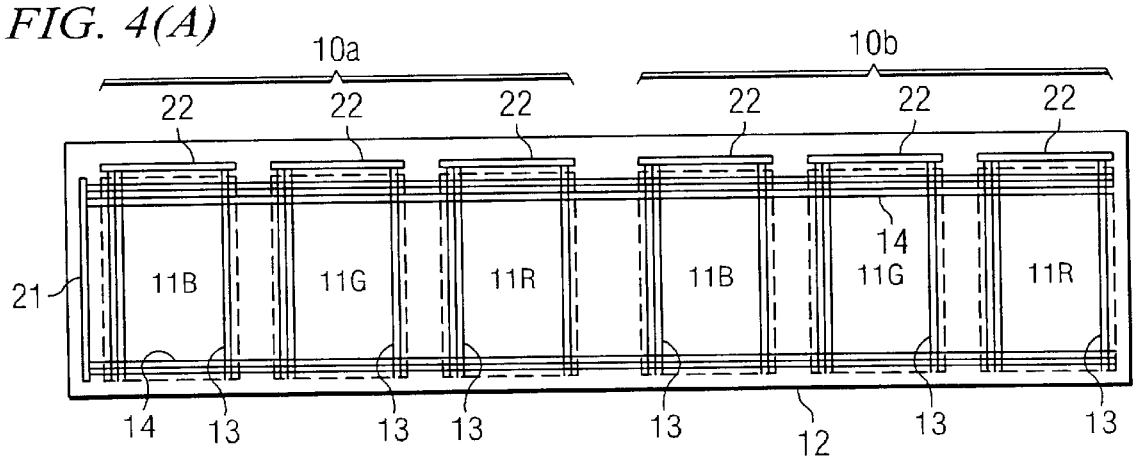
Figure 4B:
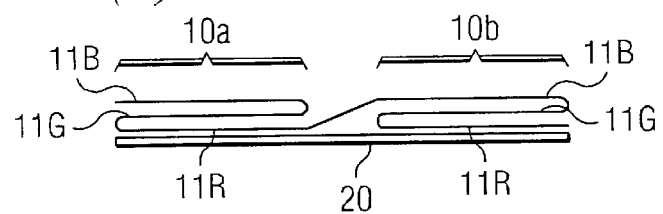

On the other hand, FIGS. 4(A) and 4(B) show an example of the information displaying apparatus equipped with two sets of color displays. In this example, each display 10a or 10b has three display layers 11B, 11G and 11R that display the three primary colors R, G and B, respectively. While in use, these three layers are stacked together to perform color display of information.

As shown FIG. 4(A), before the display layers are stacked together, the liquid crystal units to display R, G and B, respectively, are sandwiched side by side between a pair of transparent substrates 12, such that they from the display layers 11B, 11G and 11R for the first display 10a and display layers 11B, 11G and 11R for the second display 10b. The signal electrodes 13 are impressed with voltage from a signal drive IC 22 that is mounted for each display layer 11B, 11G or 11R. On the other hand, the scanning electrodes 14 run through all of the display layers 11B, 11G and 11R, i.e., they are formed as a pattern over the single substrate, and are impressed with voltage from one scanning drive IC 21.

FIG. 4(B) shows the situation in which the pair of substrates 12 shown in FIG. 4(A) is folded over such that the display layers are stacked together in the order of R, G and B from the bottom to the top to form color displays, and are mounted on a support plate 20.

Figure 5:
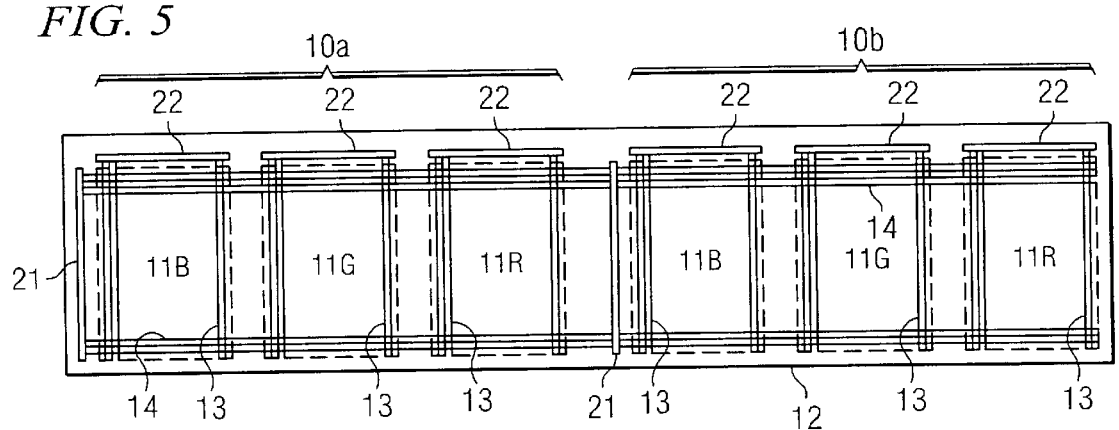
FIG. 5 is a drawing showing another example of the information displaying apparatus shown in FIGS. 4(A) and 4(B) in an extended configuration.

It is acceptable if only one color display is used in the information displaying apparatus. In this case, the scanning electrodes 14 of the display layers 11B, 11G and 11R of one unit are driven by one drive IC 21. It is also acceptable if each display 10a or 10b has a scanning drive IC 21, as shown in FIG. 5.

First Example of Liquid Crystal Display

Figure 6:
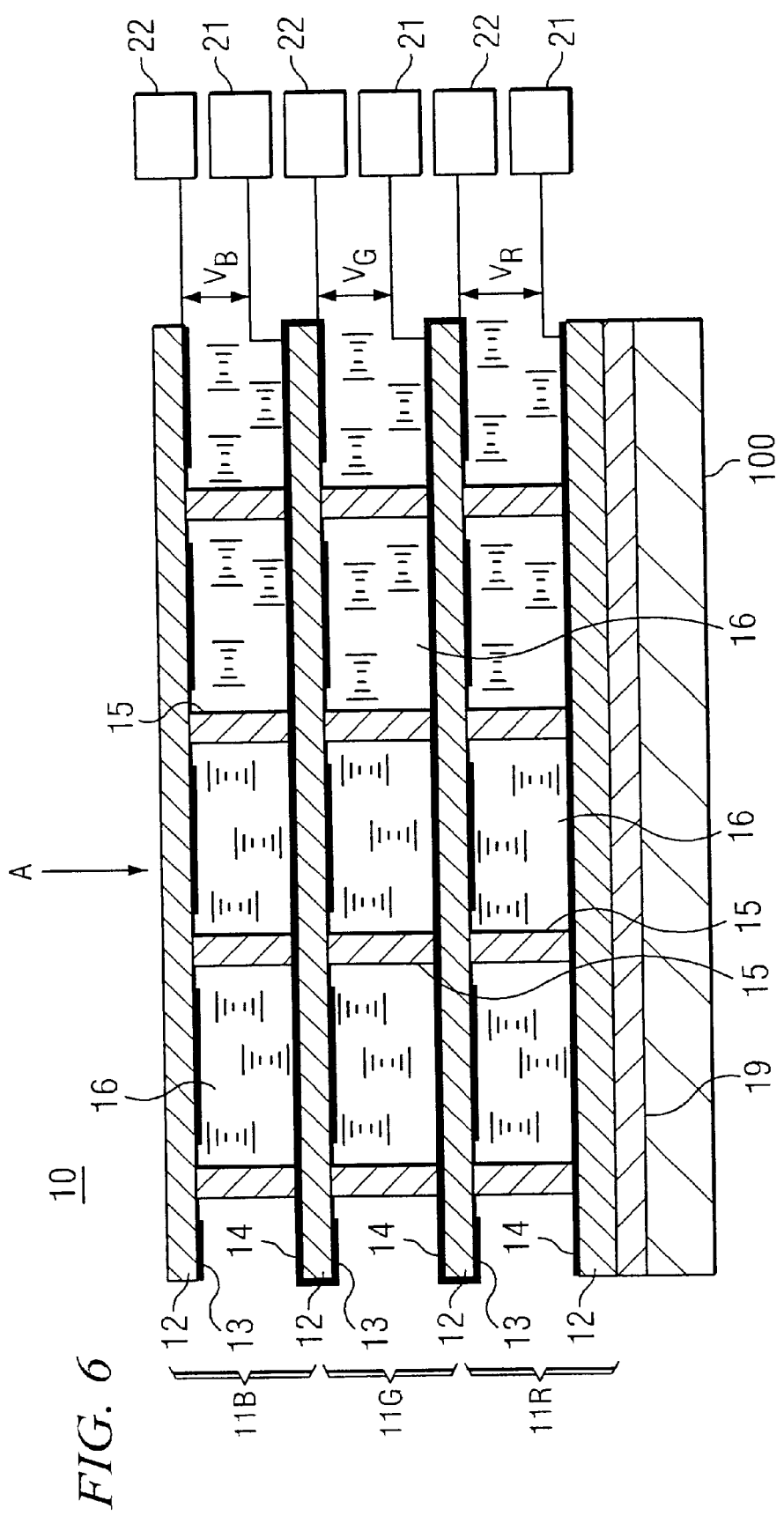
FIG. 6 is a cross-sectional view showing a first example of the liquid crystal display.

FIG. 6 shows the construction of a first example of the reflective liquid crystal display. This liquid crystal display 10 comprises a red display layer 11R that performs display by alternating between a red light selective reflection state and a transparent state, said layer being mounted on a light absorbing unit 19, a green display layer 11G that performs display by alternating between a green light selective reflection state and a transparent state, said display layer being mounted on the red display layer 11R, and a blue display layer 11B that performs display by alternating between a blue color selective reflection state and a transparent state, said display layer being mounted on the green display layer 11G.

Each display layer 11R, 11G or 11B comprises resin column structures 15 and liquid crystal 16 sandwiched between transparent substrates 12, on which transparent electrodes 13 and 14 are formed. Orientation control film or electric insulation film not shown in the drawing may be mounted on the transparent electrodes 13 and 14.

In this first example, the transparent electrodes 13 and 14 of each display layer 11R, 11G or 11B are connected to a scanning drive IC 21 and signal drive IC 22, respectively, and a prescribed pulse voltage $V_B$, $V_G$ or $V_B$ is impressed to the transparent electrodes 13 and 14. In response to the impression of this drive voltage, the liquid crystal 16 alternates between a transparent state in which it allows visible light to pass through and a selective reflection state in which it selectively reflects visible light. Where two or more displays 10 are mounted on one support plate 100, the transparent electrodes (scanning electrodes) 14 of the same color display layers of the displays 10 are electrically connected, respectively, and a pulse voltage is impressed to them from one scanning drive IC 21.

The transparent electrodes 13 and 14 on each display layer 11R, 11G or 11B comprise multiple belt-shaped electrodes that are aligned parallel to the other electrodes of its type at small intervals. The transparent electrodes 13 and 14 are made to face each other such that the belt-shaped electrodes 13 and the belt-shaped electrodes 14 are oriented in a perpendicular fashion relative to each other. Voltage is sequentially impressed to these top and bottom belt-shaped electrodes. In other words, voltage is sequentially impressed in a matrix fashion to each liquid crystal unit 16 to perform display. This is termed matrix drive. By sequentially or simultaneously performing this matrix drive for the display layers of each color, color images may be displayed on the liquid crystal display 10.

By placing a light absorbing unit 19 at the very bottom from the perspective of the observer (the direction of the arrow A), the light that passes through all the display layers 11R, 11G and 11B is totally absorbed by the light absorbing unit 19. In other words, if all of the display layers are in the transparent state, a black background color is displayed. For the light absorbing unit 19, black film may be used, for example. A black pigment such as black ink may be applied to the bottom surface of the display 10 such that the pigment may function as the light absorbing unit 19.

Materials for Display

It is preferred that transparent resin film be used for the transparent substrates 12. Materials that can be used for transparent resin film includes polyallylate resin, polyester sulfon resin, polycarbonate resin, norbornen resin, amorphous polyolefine resin and denatured acrylate resin. The required characteristics of the resin film include high light permeability, no optical anisotropy, stable size, surface smoothness, friction resistance, bending resistance, high electric insulating ability, chemical resistance, liquid crystal resistance, heat resistance, humidity resistance and gas shielding ability.

For the transparent electrodes 13 and 14, transparent electrodes comprising ITO or NESA film may be used. They are formed on the transparent substrates 12 by means of sputtering or vacuum depositing. Black electrodes may be used for the transparent electrodes 14 of the bottom display layer so that they can also function as light absorbing units.

For the liquid crystal 16, it is preferred that liquid crystal that exhibits a cholesteric phase at room temperature be used. Chiral nematic liquid crystal, which may be obtained by adding a chiral dopant to nematic liquid crystal, may also be used.

In nematic liquid crystal, rod-like liquid crystal molecules are aligned parallel to one another, but they are not arranged in layers. For nematic liquid crystal, a single-compound liquid crystal material comprising a biphenyl compound, tolane compounds, pyrimidine compound or cyclohexane compound, or a liquid crystal material comprising a mixture of these, may be used, and it is preferred that the liquid crystal have a positive dielectric constant anisotropy. Specifically, liquid crystal K15 or M15 that mainly comprises a cyanobiphenyl compound, or mixed liquid crystal MN1000XX (all manufactured by Chisso), or E44, ZLI-1565, TL-213 or BL-035 (all manufactured by Merck) may be used.

Chiral dopant is an additive that, when added to nematic liquid crystal, has the function of twisting the nematic liquid crystal molecules. By adding a chiral dopant to a nematic liquid crystal material, the liquid crystal molecules form a helix structure in which they are twisted from layer to layer, thereby exhibiting a cholesteric phase.

By varying the amount of chiral dopant added, the pitch of the helix in the chiral nematic liquid crystal material may be changed, and through the pitch of the helix, the selective reflection wavelengths of the liquid crystal material may be controlled. In general, 'helical pitch', which is defined as the distance between two molecule positions when a liquid crystal molecule rotates 360 degrees along the helix, is used as the term to express the pitch of the helix of the liquid crystal material.

For the chiral dopant, a nematic liquid crystal material in which the molecules have a layered helical structure may be used. For example, a nematic liquid crystal material comprising a biphenyl compound, terphenyl compound or ester compound may be used. Specifically, such generally marketed chiral dopants as S811, CB15, S1011 and CE2 (all manufactured by Merck), which are obtained by combining optically active radicals as the terminal radicals of the compound, may be used. Cholesteric liquid crystal materials having cholesteric rings, such as cholesteric nonanoate (CN), may be used as chiral dopants as well.

A mixture of more than one chiral dopant may be used and added to a nematic liquid crystal material. Not only combinations of chiral dopants having the same twistivity but also combinations of agents having different twistivities may be used. The use of more than one chiral dopant has the effect of changing the phase transition temperature of the cholesteric liquid crystal material and of reducing the changes regarding selective reflection wavelengths as the temperature changes, as well as the effect of changing various physical properties of the cholesteric liquid crystal material, including the dielectric constant anisotropy, refractive index anisotropy and viscosity, allowing the characteristics of the liquid crystal material when used as a display to be improved.

As materials for the column structures 15, thermoplastic resin may be used, for example. It is preferred that the material forming the column structures 15 (i) soften when heated and harden when cooled, (ii) not react with the liquid crystal material and (iii) have an appropriate level of elasticity.

Specific examples include, for example, polyvinyl chloride resin, polyvinylidene chloride resin, polyester methacrylate resin, polyester acrylate resin, polyvinyl acetate resin, polystyrene resin, polyamide resin, polyethylene resin, polypropylene resin, fluororesin, polyurethane resin, polyacrylonitrile resin, polyvinyl ether resin, polyvinyl ketone resin, polyvinyl pyrolidone resin, polycarbonate resin and chlorinated polyether resin.

The column structures 15 should be made using one or more of these resins, or a material that includes at least one of the resins or a mixture thereof.

Using a public domain printing method and one or more of the substances listed above, printing is performed using a pattern to form columns of dots. Depending on the size of the liquid crystal display and pixel resolution, the appropriate size of the cross-sectional area, the alignment pitch and configuration (cylinder, drum-shape, polygon, etc.) of the column structures are selected. In addition, it is preferred that the column structures 15 be placed between the electrodes 13, because that increases the effective area of light modulating area.

In addition, it is also acceptable if the column structures 15 are printed not in a dot pattern but in a stripe pattern. This selection should be made according to the purpose of the final product. Further, in order to increase the accuracy in the control of the gap between the substrates 12, when forming the column structures 15, if spacers that are smaller than the thickness of the resin film, such as spherical particles comprising glass fiber, glass balls, ceramic powder or particles of an organic material, are placed so that the gap does not easily change due to heat or pressure, the gap accuracy further improves and unevenness in voltage impression or in displayed colors may be reduced.

Display of Colors

In the color display layers 11R, 11G and 11B in which the chiral nematic liquid crystal material described above is used, where the selective reflection wavelengths of the cholesteric liquid crystal material are within the visible light range, while the liquid crystal material slightly scatters the incident visible light when its molecules are in the focal conic alignment state in which the helical axis of the cholesteric liquid crystal molecules is essentially parallel to the substrate surfaces, the liquid crystal material is essentially in a transparent state in which the visible light is allowed to pass through. In the planar alignment state in which the helical axis of the cholesteric liquid crystal molecules is essentially perpendicular to the substrate surfaces, the components of the incident visible light having a wavelength that corresponds to the helical pitch are selectively reflected. These two states may be alternated from one to the other by changing a prescribed environmental field such as the electric field, magnetic field or temperature, while when the environment field disappears, the state is maintained. In other words, the liquid crystal has a memory function.

Based on the characteristic described above, when using chiral nematic liquid crystal, the amount of chiral dopant to be added to the nematic liquid crystal material is adjusted so that the helical pitch of the attained chiral nematic liquid crystal may correspond to the desired selective reflection wavelengths. For example, the selective reflection wavelengths for each liquid crystal layer are adjusted so that they correspond to the wavelength range for red light, green light or blue light. By performing this adjustment, a liquid crystal material is obtained that (i) selectively reflects the light in the wavelength range for red light, green light or blue light when in the planar state, but (ii) becomes transparent and allows the visible light to pass through when in the focal conic alignment state. By sandwiching the liquid crystal material thus obtained between transparent electrodes, a color liquid crystal display may be obtained.

The liquid crystal display 10 comprising display layers 11R, 11G and 11B prepared using the materials and construction described above and stacked together can perform red display when the blue display layer 11B and green display layer 11G are set to the transparent state, where the molecules of the liquid crystal 16 of each layer are in the focal conic alignment state, and the red display layer 11R is set to the selective reflection state, where the molecules of the liquid crystal 16 of the layer are in the planar alignment state. It can also perform yellow display when the blue display layer 11B is set to the transparent state, where the molecules of the liquid crystal 16 are in the focal conic alignment state, and the green display layer 11G and red display layer 11R are set to the selective reflection state, where the molecules of the liquid crystal 16 are in the planar alignment state. Similarly, by appropriately selecting either the transparent state or the selective reflection state for each display layer, red, green, blue, white, cyan, magenta, yellow or black display may be performed. Further, by selecting an intermediate reflective selection state for each display layer 11R, 11G or 11B, intermediate colors may be displayed, so that the liquid crystal display may be used as a full-range color display.

Further, the display layers 11R, 11G and 11B in the liquid crystal display 10 may be stacked in sequences other than that shown in FIG. 6. However, considering the fact that the permeability for light in the long wavelength range is higher than that for light in the short wavelength range, a brighter display may be obtained if the selective reflection wavelengths for upper layers are shorter than the selective reflection wavelengths for lower layers, because more light reaches the lower layers. Therefore, it is preferable if the order is the blue display layer 11B, the green display layer 11G and the red display layer 11R from the side of the observer (the direction of the arrow A). The best display quality may be obtained when this order is followed.

Example of Manufacturing Liquid Crystal Display

Figure 7:
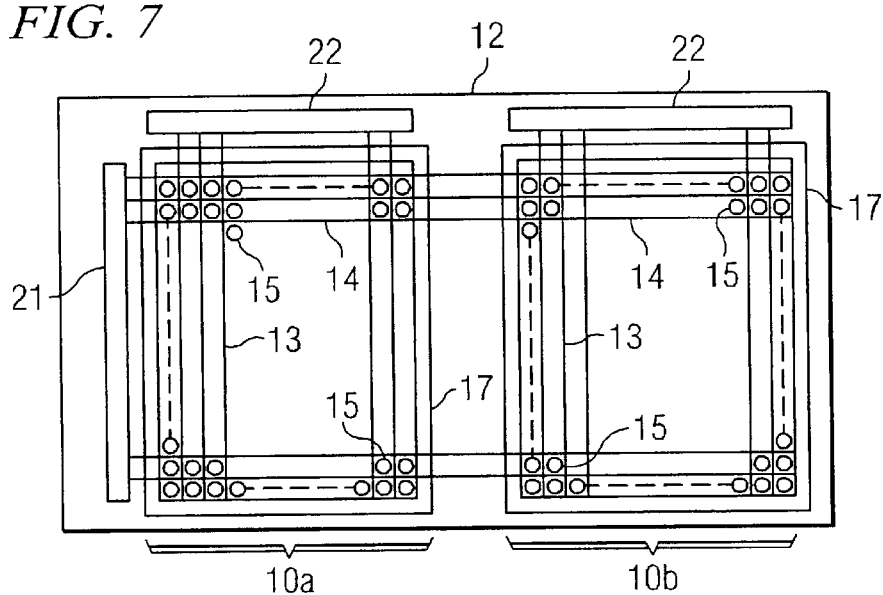
FIG. 7 is a plan view showing the situation in which column bodies and stoppers are formed on a film substrate of the liquid crystal display.

The resin column structures 15 are formed on the upper substrate 12 using the printing method mentioned above. FIG. 7 shows the upper substrate 12 where they have been formed. In this example, two displays 10a and 10b are mounted side by side on one substrate 12. The resin film comprising the substrate is made of a 20 $\mu$m PES (polyether sulfon) film (manufactured by Sumitomo Bakelite Co., Ltd.), and polyvinyl chloride is printed on the resin film using a screen print applicator MS400 (manufactured by Murakami) so that an approximately 15 $\mu$m dot pattern will be formed.

Using the public domain sputtering method, ITO film was formed on this resin film to create a configuration of 700 Å-thick belts. Using a similar machine; oxidized silicon film was formed on top to a 4,000 Å thickness, creating insulating film.

The temperature of the resin film was then adjusted to 25° C., and using the screen print applicator MS400, thermoplastic polyester resin was printed around the column structures 15 to create stoppers 17. After printing, the entire substrate unit was heated on a hot plate at 80° C. for 20 minutes in order to evaporate the solvents contained in the column structures 15 and stoppers 17.

As a result, column structures 15 having a 35 μm diameter and a 10 μm height and aligned at a 300 μm pitch and stoppers 17 having a 1 mm width and a 10 μm height were formed as one example.

Then, as a molecule orientation control agent, using the public domain spin coating method, SE-610 (manufactured by Nissan Kagaku Kogyo) was applied to an approximately 500 Å thickness and the substrate unit was heated at 180° C. for one hour.

Figure 8:
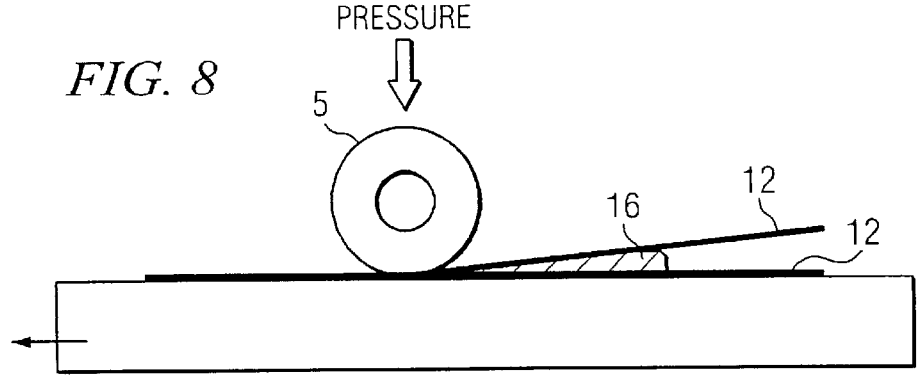
FIG. 8 is a drawing to explain the manufacturing process for the liquid crystal display.

Another piece of PES film (identical to the upper substrate), designed to become the bottom substrate, was then prepared, and was placed over the upper substrate such that the belt-shaped transparent electrode surfaces would face each other. After filling liquid crystal 16 between the two film pieces 12, the substrates were subjected under heat and pressure using the roller 5 as shown in FIG. 8 to trap liquid crystal 16 into light modulating area. However, one end of the light modulating area was kept open at this stage so that any excess liquid crystal material could be removed to the outside.

The film pieces 12 thus closed together were then sandwiched between two flat stainless steel plates. The whole unit was left in a 160° C. constant temperature oven under a 7 Kb/cm² load for one hour in order to close off the film 12 surfaces. The power to the constant temperature oven was then turned off and the unit was cooled down to room temperature under the same load. UV-hardened resin Photorec A-704-60 (manufactured by Sekisui Fine Chemical Co., Ltd.) was applied around the film pieces 12, and the closure was completed under ultraviolet irradiation.

For the liquid crystal material, MLC6068-000 (a nematic liquid crystal material manufactured by Merck) to which a chiral dopant S-811 (manufactured by Merck) was added in the amount of 2.4 percent by weight was used, for example. Using a cholesteric liquid crystal display prepared in this way, a color liquid display was made.

Voltage Impressed to Each Display Layer)

The specifications of the liquid crystal display 10 shown in FIG. 6 and the drive voltages for the display layers 11R, 11G and 11B are shown in Tables 1 and 2 below. The thickness of the display layer 11G shown in Table 1 is different from that shown in Table 2, and the effective drive voltage varies accordingly.

TABLE 1

| Dimension of Light modulating area | 10 cm × 10 cm | | | |
| Pixel pitch | 0.353 mm (72 dpi equivalent) | | | |
| Number of pixels | 240 × 240 | | | |
| Display layer | Thickness (μm) | Scanning Voltage (V) | Signal voltage (V) | Effective voltage (V) |
| --- | --- | --- | --- | --- |
| B | 9.0 | 60 | 40 | 100 |
| G | 7.0 | 60 | 30 | 90 |
| R | 5.0 | 60 | 25 | 85 |

TABLE 2

| Effective area of display | 10 cm × 10 cm | | | |
| Pixel pitch | 0.353 mm (72 dpi equivalent) | | | |
| Number of pixels | 240 × 240 | | | |
| Display layer | Thickness (μm) | Scanning Voltage (V) | Signal voltage (V) | Effective voltage (V) |
| --- | --- | --- | --- | --- |
| B | 9.0 | 60 | 40 | 100 |
| G | 7.3 | 60 | 40 | 80 |
| R | 5.0 | 60 | 25 | 85 |

Second Example of Liquid Crystal Display

Figure 9:
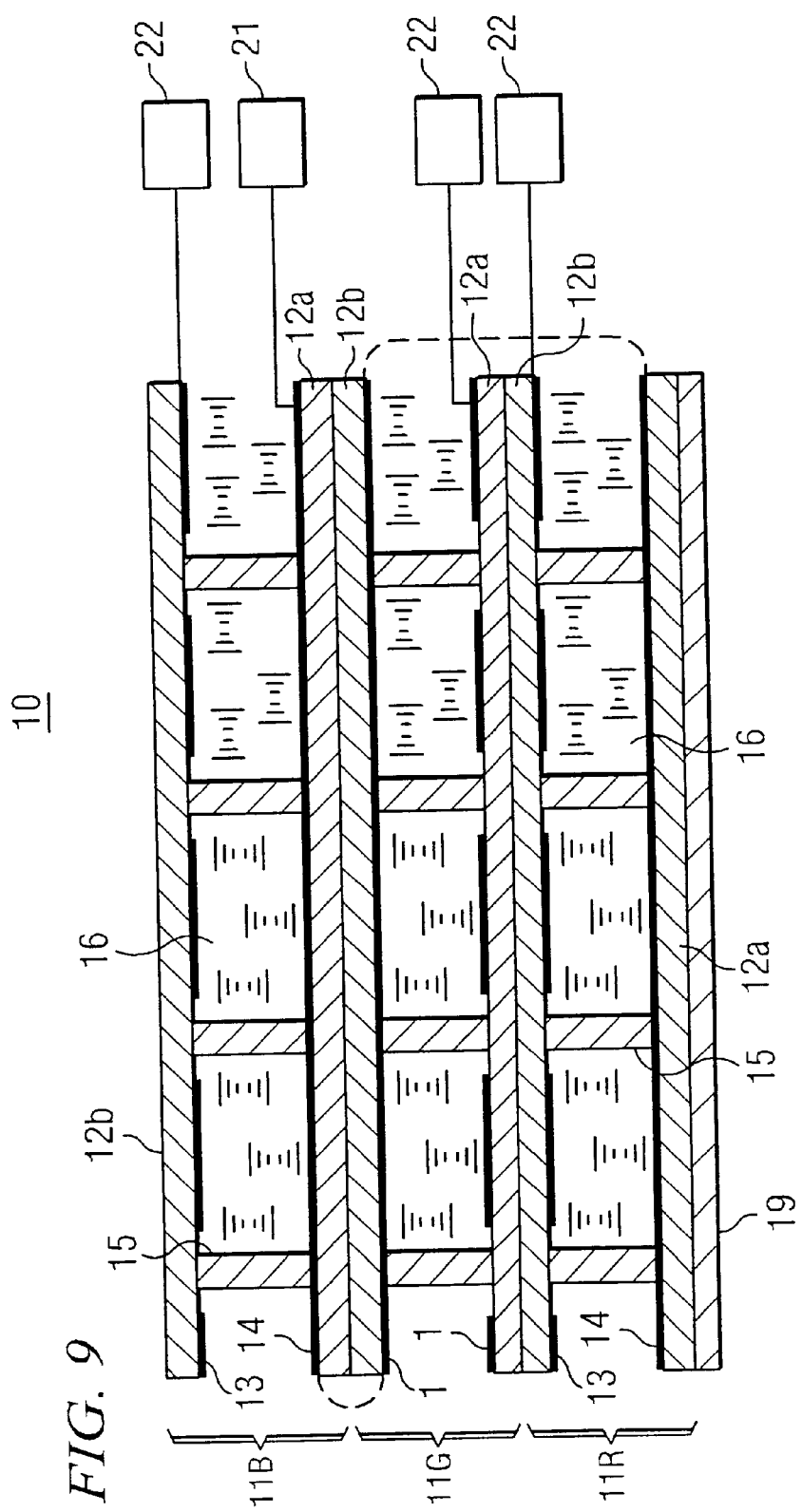
FIG. 9 is a cross-sectional view showing a second example of the liquid crystal display.

A second example of the reflective liquid crystal display is shown in FIG. 9. In this liquid crystal display 10, as shown in FIG. 4, liquid crystal 16 is sandwiched between film substrates 12 (12a and 12b) and a stacked construction is achieved by folding over the film substrates 12. FIG. 9 shows a cross-section of a part of the liquid crystal display. Each film substrate 12a or 12b is a continuous piece of film. In other words, each scanning electrode 14 also continuously runs through the display layers 11R, 11G and 11B. As described above, one scanning drive IC 21 may be shared in this case. In FIG. 9, the same numbers are used for the same members used in FIG. 6, and they will not be explained again.

Third Example of Liquid Crystal Display

Figure 10:
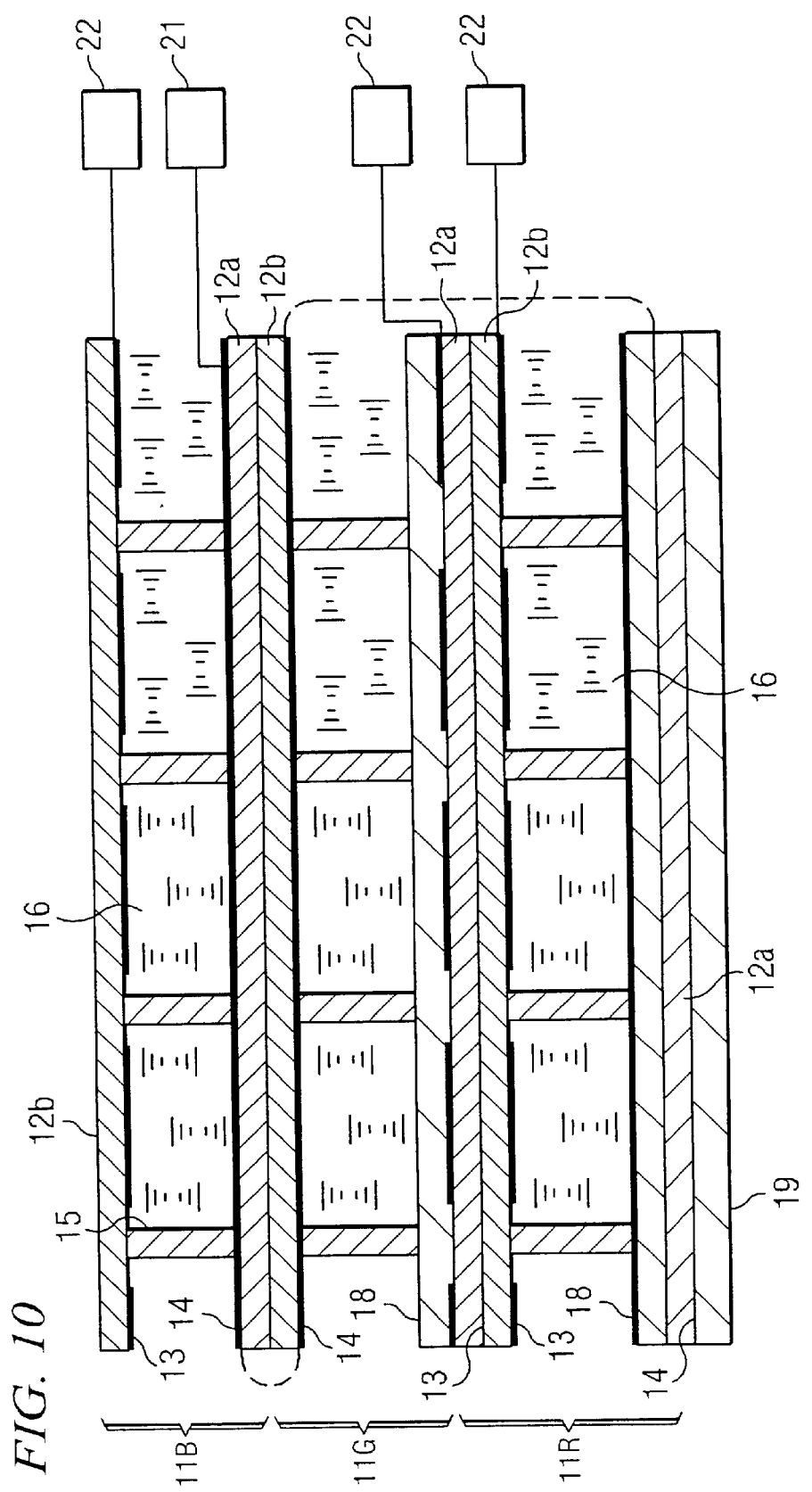
FIG. 10 is a cross-sectional view showing a third example of the liquid crystal display.

FIG. 10 shows a third example of the liquid crystal display. This liquid crystal display 10 has the same basic construction as the liquid crystal display 10 shown in FIG. 9. It is different from the example in FIG. 9, however, in that the display layers 11G and 11R include a resistance layer 18. By providing resistance layers 18, all display layers 11B, 11G and 11R may be driven using the same level of effective voltage. In other words, by providing resistance layers 18, even if the same level of voltage (100V, for example) is impressed to the display layers 11B. 11G and 11R, the voltage becomes distributed and the level of synthesized voltage shown in Table 1 is impressed to each display layer. For the resistance layer 18, silicon oxide may be applied to form an approximately 0.1 μm film by means of sputtering. The technique in which the impressed voltages are made equal to those shown in the tables by means of resistance layers 18 may be used effectively in the first example shown in FIG. 6 as well.

Method to Drive Display

Figure 11:
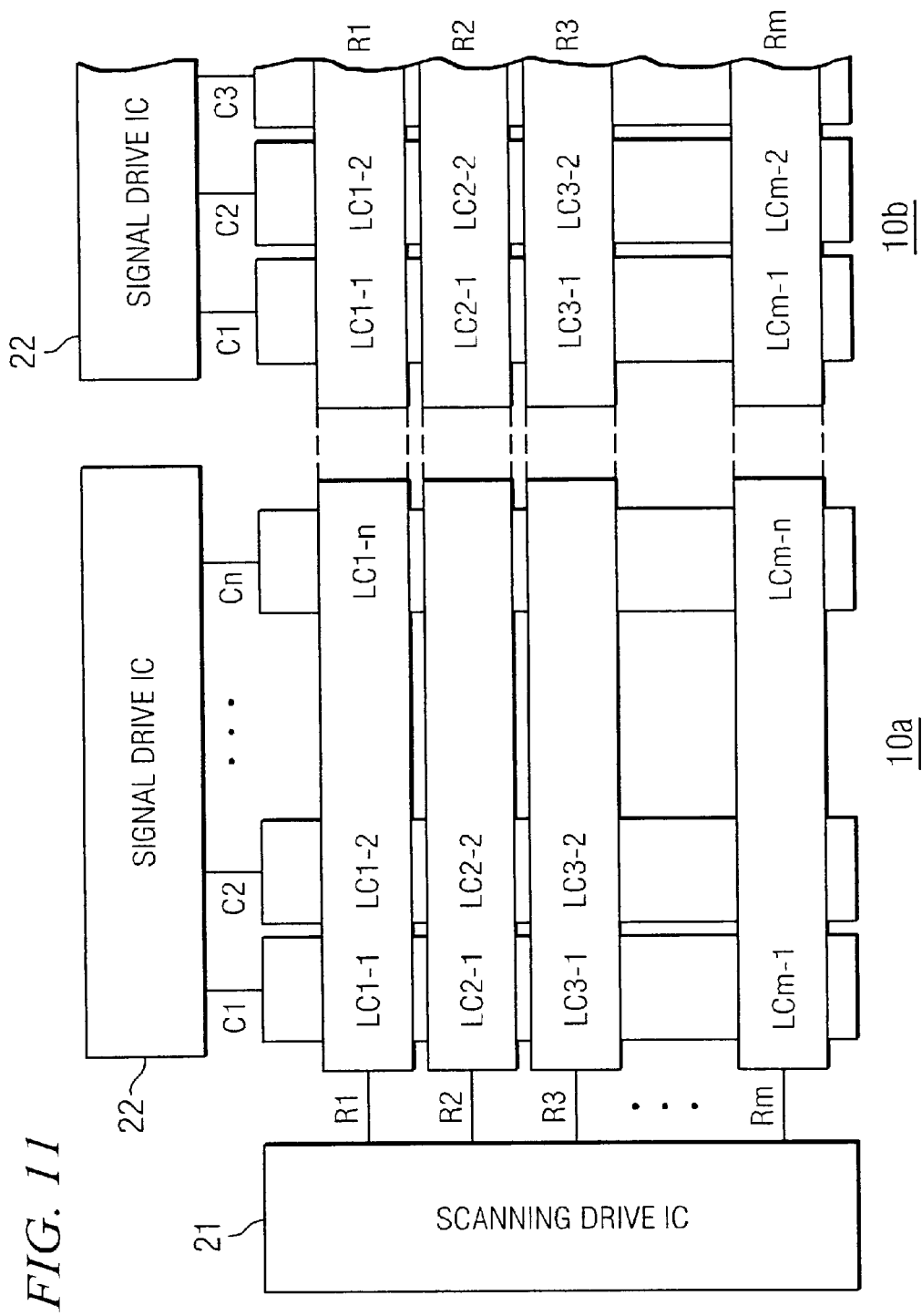
FIG. 11 is a block diagram showing a matrix drive circuit of the liquid crystal display.

The pixels of the liquid crystal display 10 are expressed in terms of the matrix of multiple scanning electrodes R1, R2, . . . Rm and the signal electrodes C1, C2, . . . Cn, C1, C2, . . . Cn (n and m are natural numbers), as shown in FIG. 11. The scanning electrodes R1, R2, . . . Rm are connected to the output terminals of the scanning drive IC 21 while the signal electrodes C1, C2, . . . Cn, C1, C2, . . . Cn are connected to the output terminals of the signal drive ICs 22.

The scanning drive IC 21, which includes a plurality of drive IC chips therein, outputs a selection signal to a prescribed scanning electrode R1, R2, . . . or Rm to set it to the selected state while it outputs non-selection signals to other electrodes to set them to the non-selected state. The scanning drive IC 21 sequentially impresses a selection signal to each scanning electrode R1, R2, . . . or Rm at prescribed intervals alternating the selected electrode. On the other hand, the signal drive ICs 22, each of which includes a plurality of drive IC chips therein as well, outputs signals corresponding to the image data to the signal electrodes C1, C2, . . . Cn, C1, C2, . . . Cn in order to rewrite the pixels on the selected scanning electrode R1, R2, . . . or Rm. For example, if the scanning electrode Ra is selected (a is a natural number that meets the condition a≦m), the pixels at the cross points between this scanning electrode Ra and the signal electrodes C1, C2, . . . Cn, C1, C2, . . . Cn i.e., pixels LRa-C1 through LRa-Cn of display 10$a$ and pixels LRa-C1 through LRa-Cn of display 10$b$ are simultaneously rewritten. Consequently, the difference in voltage (synthesize voltage) between the scanning electrode and the signal electrode at each pixel becomes the rewriting voltage for that pixel, and each pixel is rewritten in response to this rewriting voltage.

Here, if the first threshold voltage to eliminate the twist of the liquid crystal molecules that exhibits a cholesteric phase is Vth1, by impressing the voltage Vth1 for a sufficient period of time and then by reducing the voltage to the level of a second threshold voltage Vth2 which is smaller than the first threshold voltage Vth1, the liquid crystal is set to the planar state. If a voltage larger than Vth1 and smaller than Vth2 is impressed for a sufficient period of time, the liquid crystal is set to the focal conic state. These two states are stably maintained even after the impression of voltage is discontinued. In other words, these stable states are stably maintained even under no electrical field condition. In addition, by impressing a voltage that is between Vth1 and Vth2, display of intermediate tones, i.e., gradation display, may be achieved.

The rewriting of each pixel may be performed using the method described above, and when an image is already being displayed, all pixels may be reset to an even display state before the rewriting in order to eliminate any influence from the previous image. Resetting may be performed for all pixels together or for each scanning electrode. For example, it has been found that, where a pixel is to be set to the focal conic state, a relatively long period of time is needed in order to obtain a sufficiently transparent state. Therefore, if all pixels are reset to the focal conic state together prior to rewriting, the period of time required for the rewriting may be reduced relative to the case where resetting is sequentially performed for each scanning electrode.

Other Liquid Crystal Display Examples

With reference to the liquid crystal display 10, a construction in which resin column structures are provided in the liquid crystal display layers was explained, but the liquid crystal display layers may be constructed as a so-called polymer dispersion type liquid crystal composite membrane, in which (i) the liquid crystal molecules are dispersed in a three-dimensional polymer network structure, or (ii) a three-dimensional polymer network structure is formed in the liquid crystal material. In addition, while bistable liquid crystal that exhibits a cholesteric phase was used in the explanation as an example of liquid crystal having a memory function, but the present invention is not limited to this type of liquid crystal, and may be applied using ferroelectric liquid crystal. Light-transmitting liquid crystal using back lighting may also be used.

Vending System

Figure 12:
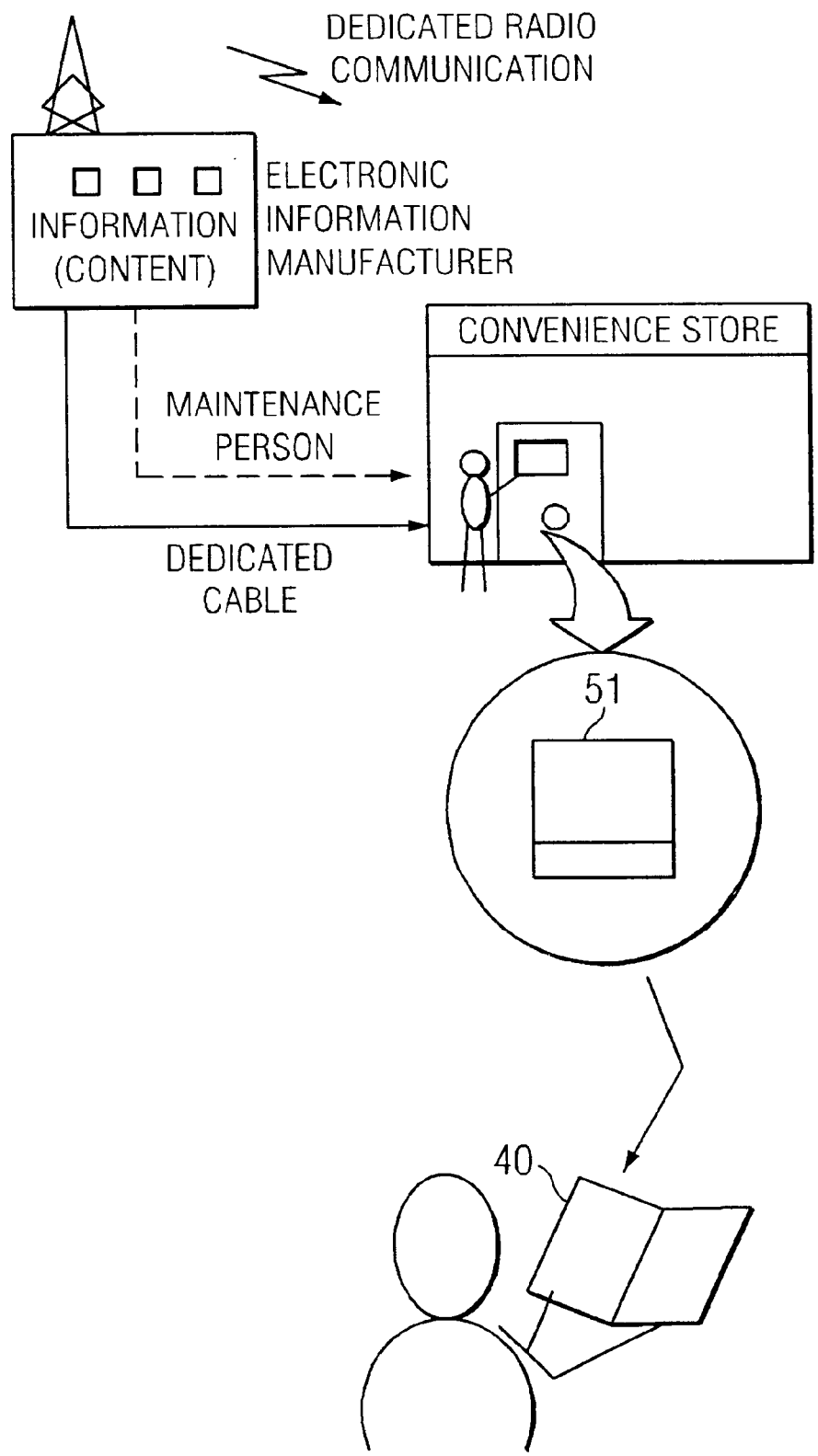
FIG. 12 is a drawing showing a first example of a vending system for recording media for the electronic book.

FIG. 12 shows a first example of the vending system that provides information recording media 51 to users who have an electronic book 40 equipped with the liquid crystal display(s) 10. The information recording media 51 are produced by publishers, etc. as electronic information manufacturers, and are brought into a convenience store, which sells the media, through a dedicated cable, dedicated radio communication or a maintenance person. The user purchases or rents the desired recording medium 51 at the convenience store. It is also acceptable if the user stores the desired information in her own electronic book 40 at the convenience store.

Figure 13:
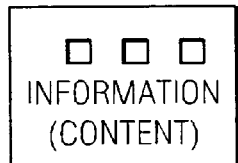
FIG. 13 is a drawing showing a second example of a vending system for recording media for the electronic book.
Figure 13:
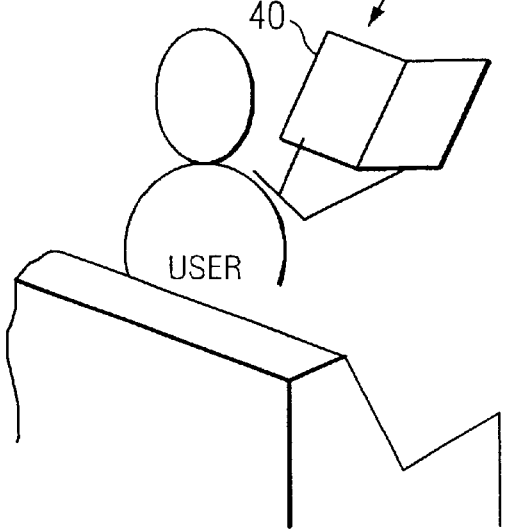

FIG. 13 shows a second example of the vending system. In this vending system, the electronic information manufacturer transfers the information that the user has ordered from a catalogue, etc. to the user's personal computer 75 through a cable (telephone line). The user either outputs the transferred information onto the screen of the personal computer or stores it in his or her own recording medium 51 so that it may be input to the electronic book 40 through the recording medium 51. The electronic information manufacturer receiving an order may also deliver the recording medium 51 directly to the user.

Other Embodiments

The information displaying apparatus pertaining to the present invention is not limited to the embodiments explained above, and may be modified within its scope of essence.

Figure 14:
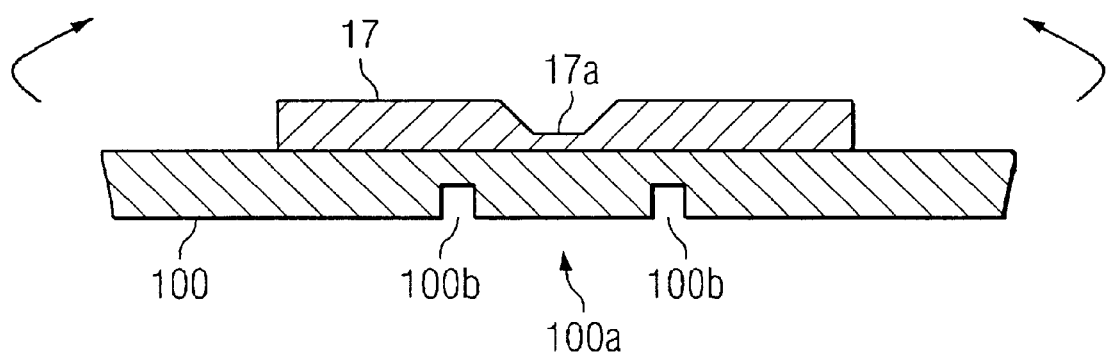
FIG. 14 is a partial sectional view of modification of the support plate.

For example, support plate 100 in each of the above mentioned examples may has a structure as shown in FIG. 14. That is, support plate 100 may have two folding grooves 100$b$ along with mid-sections 100$a$ to make ease folding. Further to this, sealing 17 for preventing leakage of liquid crystal in the displays 10$a$ and 10$b$ may be continuously provided to over the mid-section 100$a$. Sealing 17 may also have groove portion 17$a$ to make ease folding and to prevent the scanning electrodes from breaking. As understood from this, the specific examples and numbers regarding various liquid crystal materials, etc. are only examples for the present invention. In addition, various methods of use and contents of display are possible regarding the displaying apparatus or system, and the most appropriate drive method may be used for each.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An information display apparatus comprising:
   a plate;
   a first display provided on a first area of said plate, said first display comprising a first matrix of pixels;
   a second display provided on a second area of said plate which is different from said first area, said second display comprising a second matrix of pixels;
   wherein each of said first and second display has a first layer for a first color and a second layer for a second color different from said first color;
   said information display apparatus further comprising:
      a plurality of first signal electrodes corresponding to said first layer of said first display;
      a plurality of second signal electrodes corresponding to said second layer of said first display;
      a plurality of third signal electrodes corresponding to said first layer of said second display;

a plurality of fourth signal electrodes corresponding to said second layer of said second display;

a plurality of first scanning electrodes commonly provided to said first layer of said first display and said first layer of said second display; and a plurality of second scanning electrodes commonly provided to said second layer of said first display and said second layer of said second display.

2. An information display apparatus comprising:

a first display layer for a first color, said first display layer comprising a plurality of first scanning electrodes and a plurality of first signal electrodes;

a second display layer for a second color different from said first color, said second display layer comprising a plurality of second scanning electrodes and a plurality of second signal electrodes; and a driver connected to said first and second scanning electrodes and said first and second signal electrodes, said driver applying a first voltage to said first scanning electrodes and second voltage to said second scanning electrodes, said first voltage being same as said second voltage.

3. An information display apparatus as claimed in claim 2, wherein said first scanning electrodes are electrically connected with said second scanning electrodes, respectively.

4. An information display apparatus as claimed in claim 2, wherein said driver applying a third voltage to said first signal electrodes and a fourth voltage to said second signal electrodes, said third voltage is different from said fourth voltage.

5. An information display apparatus as claimed in claim 2, wherein said second display layer is stacked on said first display layer.

6. An information display apparatus comprising:

a first display layer for a first color, said first display layer comprising a plurality of first scanning electrodes and a plurality of first signal electrodes; and a second display layer for a second color different from said first color, said second display layer comprising a plurality of second scanning electrodes and a plurality of second signal electrodes, said second scanning electrodes being electrically connected with said first scanning electrodes, respectively.

7. An information display apparatus as claimed in claim 6, wherein each of said first and second display layers comprises a liquid crystal.

8. An information display apparatus as claimed in claim 7, wherein said liquid crystal is a cholesteric liquid crystal.

9. An information display apparatus as claimed in claim 8, wherein said liquid crystal is a chiral nematic liquid crystal.

10. An information display apparatus as claimed in claim 6, wherein said second display layer is stacked on said first display layer.

11. An information display apparatus as claimed in claim 6, further comprising:

a scanning electrode driver, commonly provided to the first and second scanning electrodes, the scanning electrode driver connected with the first and second scanning electrodes;

a first signal electrode driver connected with the first signal electrodes; and a second signal electrode driver connected with the second signal electrodes.

12. An information display apparatus as claimed in claim 11, wherein the first scanning electrode driver simultaneously applies a same voltage to one of the first scanning electrodes and one of the second scanning electrodes that is electrically connected with the one of the first scanning electrodes.

* * * * *

UNITED STATES PATENT AND TRADEMARK OFFICE
CERTIFICATE OF CORRECTION

PATENT NO.    : 6,697,039 B1
DATED         : February 24, 2004
INVENTOR(S)   : Eiji Yamakawa et al.

It is certified that error appears in the above-identified patent and that said Letters Patent is hereby corrected as shown below:

Column 1,
Lines 6 and 7, delete "Nos. 11-046689 and 11-162536 filed on Feb. 24, 1999, respectively", and insert -- Nos. 11-046689 and 11-162536 filed on Feb. 24, 1999, and June 9, 1999, respectively --.

Column 5,
Line 25, delete "$V_B$, $V_G$, or $V_B$", and insert -- $V_R$, $V_G$, or $V_B$ --.

Column 9,
Line 47, before "Voltage", insert -- ( --.

Signed and Sealed this

Twenty-first Day of September, 2004

JON W. DUDAS
*Director of the United States Patent and Trademark Office*